United States Patent [19]
Alferness

[11] 4,390,236
[45] Jun. 28, 1983

[54] TUNABLE POLARIZATION INDEPENDENT WAVELENGTH FILTER

[75] Inventor: Rodney C. Alferness, Holmdel, N.J.

[73] Assignee: Bell Telephone Laboratories, Incorporated, Murray Hill, N.J.

[21] Appl. No.: 245,626

[22] Filed: Mar. 19, 1981

[51] Int. Cl.³ .............................................. G02B 5/174
[52] U.S. Cl. ................................. 350/96.14; 350/384; 350/392
[58] Field of Search .................. 350/96.13, 96.14, 370, 350/374, 384, 389, 392; 333/21 R, 21 A

[56] References Cited

U.S. PATENT DOCUMENTS

| | | | |
|---|---|---|---|
| 3,605,044 | 9/1971 | Seidel | 333/21 R X |
| 3,877,782 | 4/1975 | Kaminow | 350/96.14 |
| 4,054,362 | 10/1977 | Baues | 350/96.14 |
| 4,157,860 | 6/1979 | Marcatili | 350/96.14 |
| 4,220,395 | 9/1980 | Wang et al. | 350/96.13 X |
| 4,243,295 | 1/1981 | Alferness | 350/96.14 |
| 4,262,993 | 4/1981 | Burns et al. | 350/96.14 |
| 4,262,994 | 4/1981 | Sheem | 350/96.14 |
| 4,291,939 | 9/1981 | Giallorenzi et al. | 350/96.14 |

FOREIGN PATENT DOCUMENTS

| | | | |
|---|---|---|---|
| 54-21360 | 2/1979 | Japan | 350/96.14 |
| 54-156555 | 12/1979 | Japan | 350/96.14 |

OTHER PUBLICATIONS

Minakata, "Efficient LiNbO₃ Balanced Bridge Modulator/Switch With . . .," *Appl. Phys. Lett.*, vol. 35, No. 1, Jul. 1979, pp. 40-42.
Izutsu et al, "An Electrooptic TE-TM Mode Converter Using . . .," *Proc. of Opt. Commun. Conf.*, Amsterdam, Sep. 1979, pp. 15.2-1 to 15.2-4.
Kondo et al, "Wavelength Selective Optical Fiber Switches Based On . . .," *Proc. of Opt. Commun. Conf.*, Amsterdam, Sep. 1979, pp. 16.7-1 to 16.7-5.
Alferness, "Efficient Waveguide Electro-Optic TE⇌TM Mode Converter . . .," *Appl. Phys. Lett.*, vol. 36, No. 7. Apr. 1980, pp. 513-515.
IEEE Journal of Quantum Electronics, vol. QE-12, No. 7, Jul. 1976, "Switched Directional Couplers with Alternating Δβ", Kogelnik et al, pp. 396-401.

*Primary Examiner*—John D. Lee
*Attorney, Agent, or Firm*—S. Sherman

[57] ABSTRACT

Tunable, polarization independent wavelength filtering is obtained in a circuit configuration comprising an input polarization selective coupler which separates the TM and TE mode waves. A first, wavelength selective mode converter, in the TE mode wavepath, converts the TE mode wave energy at the selected wavelength to the TM mode. Similarly, a second wavelength selective mode converter, located in the TM mode wavepath, converts the TM mode wave energy at the selected wavelength to the TE mode. An output polarization selective coupler combines the TE and TM mode wave energy at the selected wavelength in one output wavepath and combines the balance of the input signal in a second wavepath. By cascading a plurality of such circuits, each tuned to a different wavelength, a wavelength multiplexed signal can be demultiplexed.

5 Claims, 8 Drawing Figures

TUNABLE POLARIZATION INDEPENDENT WAVELENGTH FILTER

TECHNICAL FIELD

This application relates to tunable polarization independent optical wavelength filters.

BACKGROUND OF THE INVENTION

Guided wave optical devices, such as switches and filters, tend to operate differently for different directions of wave polarization. This creates a problem inasmuch as available single mode fibers do not preserve any particular direction of polarization. As a result, a linearly polarized optical signal applied at the input end of a fiber emerges at the output end with an arbitrary elliptical polarization that can vary with time. Under these circumstances, a single polarization switch or filter would yield unacceptably high crosstalk and loss whenever the polarization of the received signal is different than the particular polarization for which the switch is designed.

Efforts to obviate this problem have been directed to both the fiber and the devices. With respect to the former, specially fabricated birefringent fibers, that maintain linear polarization, are currently under investigation and have been demonstrated for only short lengths. In addition, questions concerning loss, cabling and splicing have not been addressed.

With respect to the devices, filters suitable for single mode multiplexing/demultiplexing include planar corrugated waveguides (gratings), and an electrically tunable directional coupler. Such devices, when fabricated in birefringent substrates result in a filter response whose center wavelength depends upon polarization. The filter center wavelength for grating filters is directly proportional to the effective index seen by the respective modes. For the directional coupler filter, the phase match wavelength depends upon the intersection of the dispersion curves for the two waveguides. In either case, material and modal birefringence wil normally result in different center wavelengths for the TE and TM modes.

A further difficulty relates to tuning, and is due to the fact that the orthogonally polarized modes see different electrooptic coefficients. As a result, changes in the two indices, produced by a common tuning voltage, are different. This makes it impossible to simultaneously tune the two polarizations to the same filter center wavelength by means of a single tuning signal.

In U.S. Pat. No. 4,273,411, a wavelength filter is described which, as a practical matter, can be made to be polarization independent. However, such a device is not inherently polarization independent in that the effective refractive indices for the TE and TM modes are not necessarily equal.

SUMMARY OF THE INVENTION

A tunable polarization independent optical wavelength filter, in accordance with the present invention, comprises an input polarization selective coupler for separating the TE and TM mode signal components in the input signal; a first wavelength selective mode converter, located in the TE mode wavepath, for converting TE mode wave energy at the selected wavelength to the TM mode; a second wavelength selective mode converter, located in the TM mode wavepath, for converting TM mode wave energy at the selected wavelength to the TE mode; and an output polarization selective coupler for combining the TE and TM mode wave energy at the selected wavelength in one output wavepath, and for combining the balance of the input signal wave energy in a second wavepath.

It is an advantage of the invention that while the several components of the filter are themselves polarization sensitive, the filter overall is inherently polarization independent. Indeed, the invention utilizes the polarization sensitivities of the individual structures to produce the various functions of selective coupling and wavelength selective mode conversion.

BRIEF DESCRIPTION OF THE DRAWINGS

FIG. 4 shows an illustrative embodiment of a wavelength selective mode converter;

DETAILED DESCRIPTION

Figure 1:
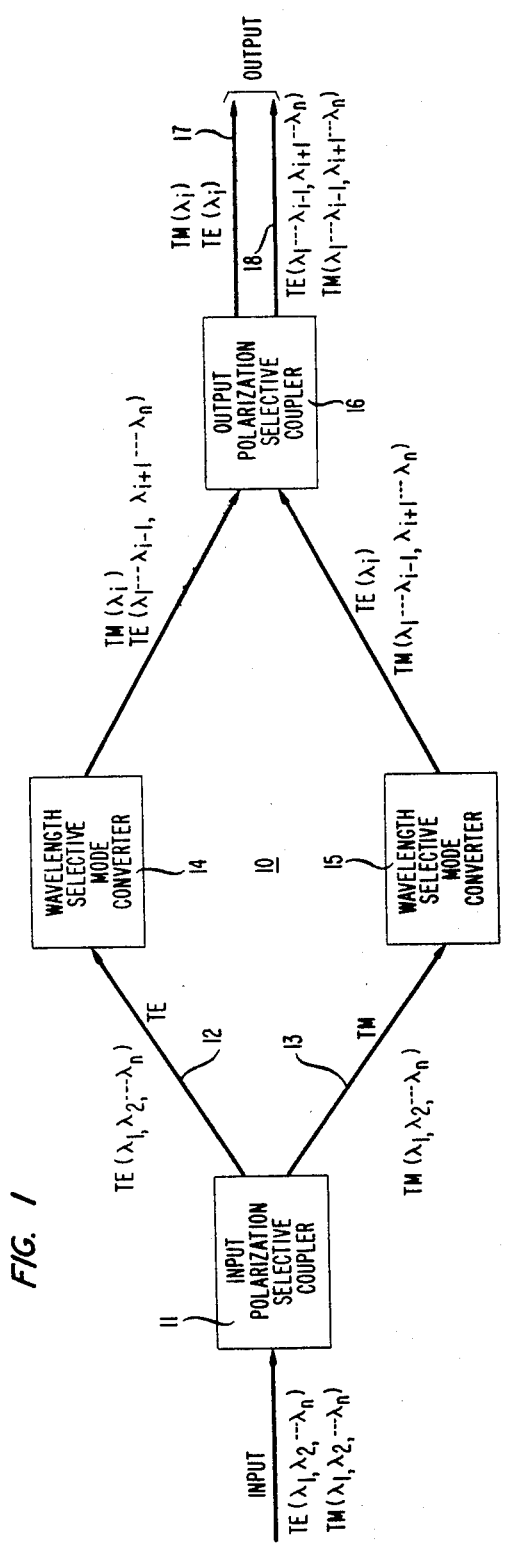
FIG. 1 shows, in block diagram, a polarization independent, wavelength selective filter in accordance with the present invention.

Referring to the drawings, FIG. 1 shows, in block diagram, a polarization independent, wavelength selective filter 10, in accordance with the present invention, comprising an input polarization selective coupler 11 and an output polarization selective coupler 16 interconnected by means of two wavepaths 12 and 13, each of which includes a wavelength selective mode converter 14 and 15. Advantageously, the two mode converters are identical, as will be explained hereinbelow. The object of the filter is to accept a broadband (i.e., multiwavelength) input signal of arbitrary polarization and to selectively filter out one of the channels. Thus, in operation, a multichannel input signal is applied to the input port of the input polarization selective coupler 11. Being arbitrarily polarized, the input signal includes orthogonally polarized components which, in integrated optical circuits of particular interest, are designated the TE and TM modes. Accordingly, the input signal is identified as TE ($\lambda_1, \lambda_2 \ldots \lambda_n$) and TM ($\lambda_1, \lambda_2 \ldots \lambda_n$), where $\lambda_1, \lambda_2 \ldots \lambda_n$ are the center wavelengths of the respective channels. Input polarization selective coupler 11, to be described in greater detail hereinbelow, separates the two modes, coupling the TE mode signal components to wavepath 12, and the TM mode signal components to wavepath 13. Each of the signal components is, in turn, coupled to a wavelength selective mode converter wherein the mode of one of the channels is converted to an orthogonal mode. Thus, for example, if the channel tuned to $\lambda_i$ is to be separated, mode converters 14 and 15 are designed to selectively convert between modes TE and TM at wavelength $\lambda_i$. Accordingly, the output of converter 14 includes a TM component at wavelength $\lambda_i$, and the balance of the incident TE components at wavelengths $\lambda_1 \ldots \lambda_{i-1}, \lambda_{i+1} \ldots \lambda_n$. Similarly, the output from converter 15 includes a TE component at wavelength $\lambda_i$ and the balance of the incident TM components at wavelengths $\lambda_1 \ldots \lambda_{i-1}, \lambda_{i+1} \ldots \lambda_n$.

The signals thus produced are then coupled to output polarization selective coupler 16 which operates in the same manner as the input coupler. That is, coupler 16 separates TM and TE mode signals. Thus, the TM ($\lambda_i$) component from converter 14 is transmitted to output wavepath 17 and TE ($\lambda_1 \ldots \lambda_{i-1}, \lambda_{i+1} \ldots \lambda_n$) components are coupled to output wavepath 18. Similarly, the TM ($\lambda_1 \ldots \lambda_{i-1}, \lambda_{i+1} \ldots \lambda_n$) components from converter 15 are transmitted to output wavepath 18 and the TE ($\lambda_1$) component is coupled to wavepath 17. The net overall effect is to separate channel $\lambda_i$ from the balance of the input signal. The remaining channels are separated, if desired, by cascading filter sections of the type illustrated in FIG. 1 where, in each section, the mode converters are tuned to a different channel wavelength.

Figure 2:
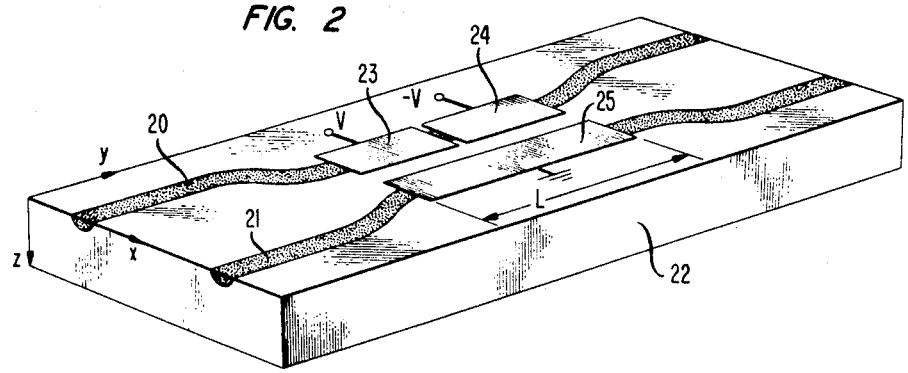
FIG. 2 shows an illustrative embodiment of a polarization selective coupler.

FIG. 2, now to be considered, is an illustrative embodiment of a polarization selective coupler that can be used to practice the present invention. The coupler, designed for use in an optical system, comprises a birefringent, electrooptic substrate 22 in which there are embedded a pair of dielectric waveguides 20 and 21. The latter, which are in coupling relation over an interval L, are made so that they have the same propagation constants for one direction of wave polarization but significantly different phase constants for waves polarized orthogonally to said one direction. Devices having these characteristics can be made in a number of ways, as described in copending application, Ser. No. 245,628, filed Mar. 19, 1981, by R. C. Alferness and J. L. Jackel. For example, if the substrate is made of z-cut lithium niobate (or tantalate) a pair of identical waveguides are first formed by the infusion of titanium along a strip that extend in the y direction. For this crystal orientation, the phase constant, $\beta_{TE}$, of the TE mode component is a function of $n_o$, the ordinary refractive index, whereas the phase constant, $\beta_{TM}$, of the TM mode component is a function of $n_e$, the extraordinary refractive index. Inasmuch as $n_o$ and $n_e$ for the two waveguides 20 and 21 are the same, we have $$\beta_{TE(20)} = \beta_{TE(21)}$$

and $$\beta_{TM(20)} = \beta_{TM(21)}.$$

To destroy the equality for the TM mode and, thereby make the coupling mode selective, one of the waveguides is suitably masked and the other waveguide is subjected to a period of out-diffusion which has the effect of changing the value of $n_e$ for the outdiffused guide. The net result is that $\beta_{TM(20)}$ is no longer equal to $\beta_{TM(21)}$ so that coupling occurs only for the TE mode.

To accommodate fabrication errors in the two guides, electrodes 23, 24 and 25 are provided. In particular, a single electrode 25 is disposed above waveguide 21 and split electrodes 23 and 24 are disposed above waveguide 20. Control voltages V and $-V$ are applied, respectively, to electrodes 23 and 24 to effect alternating $-\Delta\beta$ switching of the TE mode signal component as explained by H. Kogelnik and R. V. Schmidt in their article entitled "Switched Directional Couplers with Alternating $\Delta\beta$," published in the July, 1976 issue of the *Institute of Electrical and Electronics Engineers, Journal of Quantum Electronics,* Vol. QE-12, No. 7.

Figure 3:
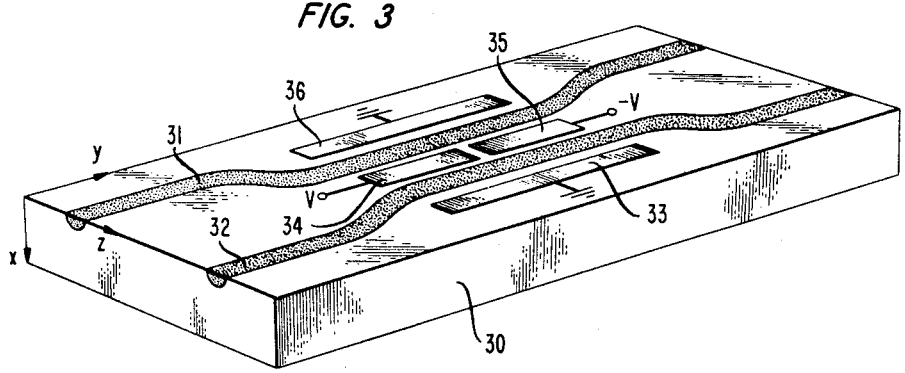
FIG. 3 shows an alternative embodiment of a polarization selective coupler.

FIG. 3 illustrates an alternative embodiment of a polarization selective coupler in which the TM mode is the coupled mode and the TE mode is the through mode. In this embodiment, an x-cut crystal substrate 30 is employed and, as in the embodiment of FIG. 2, a pair of identical wavepaths 31 and 32 are formed along the y direction. Because of the different crystal orientation, however, the phase constant, $\beta_{TE}$, for the TE mode is a function of $n_e$, whereas $\beta_{TM}$ is a function of $n_o$. To decouple the waveguides for the TE mode, one of the waveguides is suitably masked and the other waveguide is exposed to a bath of silver nitrate ($AgNO_3$). As a result of this exposure, $n_e$ of the exposed guide is changed so that $\beta_{TE(31)} \neq \beta_{TE(32)}$. Thus, for this embodiment, the TM mode is the coupled mode and TE is the through mode.

Electrodes 33, 34 and 35 are provided for adjustment purposes. To provide a z-directed electrical field component, as required when using an $LiNbO_3$ substrate, the electrodes are located along opposite sides of at least one of the guides. Thus, one electrode 33 extends coextensively over the coupling interval along one side of waveguide 32. The other electrodes 34 and 35 are located between guides 31 and 32. Once again, the split electrode configuration is used to effect alternating $-\Delta\beta$ coupling. A fourth electrode 36 can optionally be located along the outside edge of waveguide 31 to reduce the required voltage by producing a push/pull change in the indices between the two waveguides.

It should be noted that because of the symmetry of the filter shown in FIG. 1, either of the above-described couplers can be used in the filter and, indeed, one type coupler can be used at one end of the filter and the other type coupler used at the other end of the filter provided the necessary crystal orientations are observed.

The mode converters 14 and 15 can be any one of the many known devices of this type. (See, for example, U.S. Pat. No. 3,877,782.) Which one is selected will depend upon the crystal cut of the substrate material. For example, an x-cut lithium niobate (or tantalate) substrate will require the use of interdigital electrodes. Inasmuch as it is the spacing of the electrode fingers that determines the wavelength at which mode conversion occurs, it is important that the spacing be the same for both converters. This is achieved in the configuration shown in FIG. 4 wherein the two mode converters 14 and 15 share a common set of electrodes 43 and 44. One mode converter comprises waveguide 40 and the common electrodes 43 and 44. The other converter comprises waveguide 41 and the common electrodes 43 and 44.

It should be noted that waveguides 40 and 41 are not in coupling relationship. The former waveguide, corresponding to wavepath 12 in FIG. 1, and the latter waveguide, corresponding to wavepath 13 in FIG. 1, are located sufficiently far apart to preclude such coupling.

Figure 5:
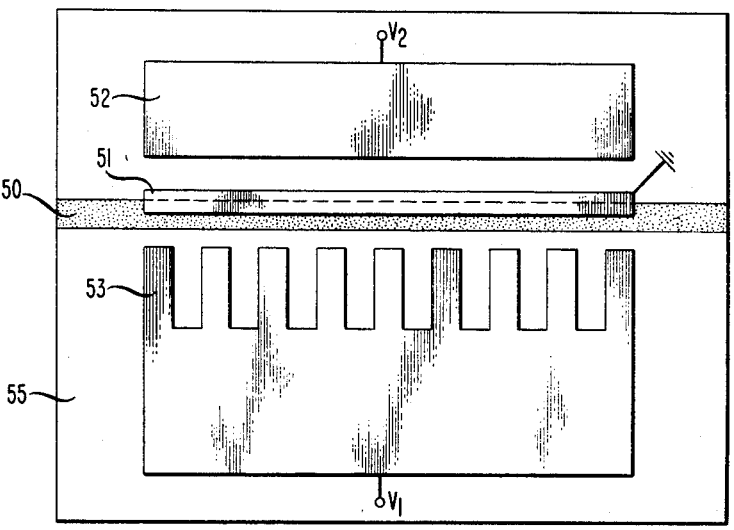
FIG. 5 shows an illustrative embodiment of a tunable wavelength selective mode converter.

A desirable feature of a filter is its electrical tunability. FIG. 5, now to be considered, shows an alternative embodiment of a wavelength selective mode converter that can be tuned electrically. Using, for purposes of illustration, a z-cut, y-propagating crystal, each converter is provided with three electrodes. A first uniform electrode 51 extends along waveguide 50, partially covering the latter. This electrode is grounded and is used as the reference electrode for control voltages applied to the other two electrodes. A second uniform electrode 52 is located on one side of electrode 51 and a third, finger electrode 53 is located along the opposite side of electrode 51. For reasons which will become apparent, electrode 51 is laterally displaced relative to waveguide 50 in the direction of electrode 52.

As is known, mode conversion in a z-cut crystal is effected via the off-diagonal $r_{51}$ element of the reduced electrooptic tensor by the application of an x-directed electric field component. Thus, the mode conversion efficiency is adjusted by the application of a first voltage $V_1$ to electrode 53. The wavelength at which mode conversion occurs depends upon the relative magnitudes of the effective refractive indices for the TE and TM modes and the finger-to-finger spacing of electrode 53. Thus, to tune the converter, a second voltage, $V_2$, is applied to electrode 52. The resulting z-directed field component operates upon $r_{13}$ and $r_{33}$ to change the wavelength for which the finger spacing is appropriate.

For example, with no voltage applied, the filter center frequency $\lambda_o$ is given by $$\frac{2\pi}{\lambda_o} |(N_{TE})_o - (N_{TM})_o| = \frac{2\pi}{\Lambda} \quad (1)$$

where $\Lambda$ is the electrode finger-to-finger spacing; and
$(N_{TE})_o$ and $(N_{TM})_o$ are the effective indices for the TE and TM modes for zero applied voltage.

For a z-cut crystal, the application of a tuning voltage $V_2$ produces a change in the effective indices such that $$(N_{TE})_{V_2} = (N_{TE})_o + \frac{N_o^3 r_{13}}{2} \cdot \alpha_{TE} E_z \text{ and} \quad (2)$$

$$(N_{TM})_{V_2} = (N_{TM})_o + \frac{N_e^3 r_{33}}{2} \cdot \alpha_{TM} E_z \quad (3)$$

where $N_o$ and $N_e$ are the ordinary and extraordinary refractive indices;
$r_{13}$ and $r_{33}$ are electrooptic coefficients;
$\alpha_{TE}$ and $\alpha_{TM}$ are the overlap parameters for the respective modes; and
$E_z$ is the field component in the z direction due to applied voltage $V_2$.

The new phase wavelength $\lambda = \lambda_o + \Delta\lambda$ is given by $$\frac{2\pi}{\lambda_o \left(1 + \frac{\Delta\lambda}{\lambda_o}\right)} \left| (N_{TE})_o - (N_{TM})_o + \frac{E_z}{2}(\alpha_{TE} N_o^3 r_{13} - \alpha_{TM} N_e^3 r_{33}) \right| = 2\frac{\pi}{\Lambda} \quad (4)$$

Noting that $\Delta\lambda/\lambda_o$ is small, and neglecting second order effects, the fractional change in the center wavelength $\Delta\lambda/\lambda_o$ is given by $$\frac{\Delta\lambda}{\lambda_o} = \frac{\frac{E_z}{2} |\alpha_{TE} N_o^3 r_{13} - \alpha_{TM} N_e^3 r_{33}|}{|(N_{TE})_o - (N_{TM})_o|} \quad (5)$$

When properly tuned, the mode converter is phase matched at the wavelength of interest. That is, tuning voltage $V_2$ is selected such that $\Delta\beta = 0$ for the channel to be dropped where $$\Delta\beta = \frac{2\pi}{\lambda} |N_{TE} - N_{TM}| - \frac{2\pi}{\Lambda} \quad (6)$$

$\lambda$ is the wavelength of interest;
$N_{TE}, N_{TM}$ are the effective refractive indices for the respective modes; and
$\Lambda$ is the finger-to-finger spacing of electrode 53.

This tuning is in contrast to the adjustment of the combined phase shifter and mode converter described in my copending application, Ser. No. 216,309, filed Dec. 15, 1980, wherein the applied voltages are adjusted for a mismatch such that $0 < \Delta\beta L \leq 2\pi$ at the wavelength of interest.

It should be noted that the tuning, which is a function of the difference between $r_{13}$ and $r_{33}$, is totally independent of the state of polarization of the incident signal. Accordingly, a complete band separation filter can be constructed by cascading a plurality of identical filter sections of the type illustrated in FIG. 1, and the individual channel wavelengths selected by adjusting the tuning voltage $V_2$ on the mode converters in each section.

Figure 6:
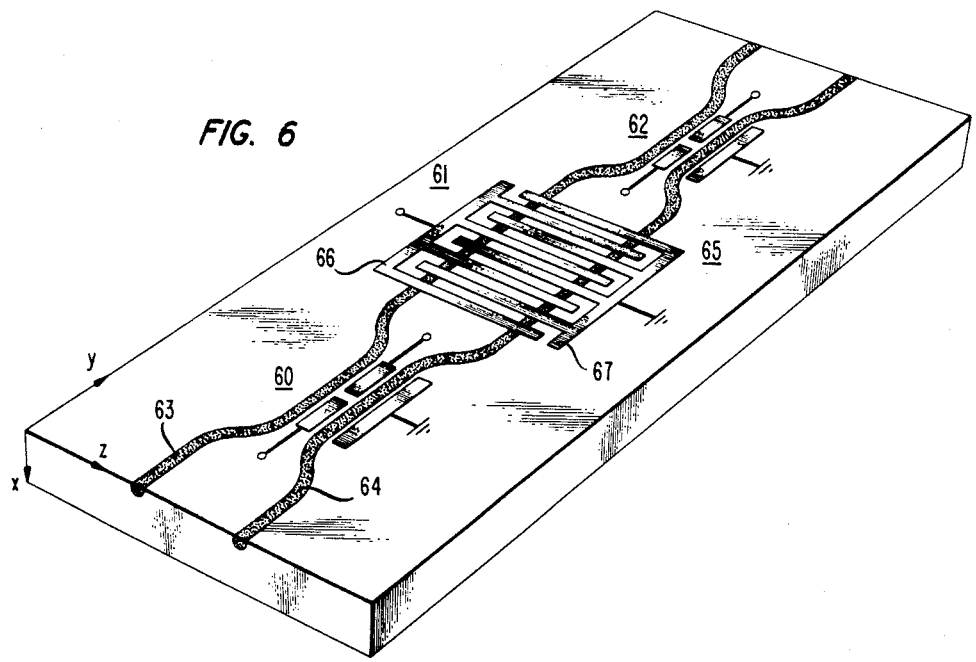
FIGS. 6, 7 and 8 show three integrated optical embodiments of the invention.
Figure 7:
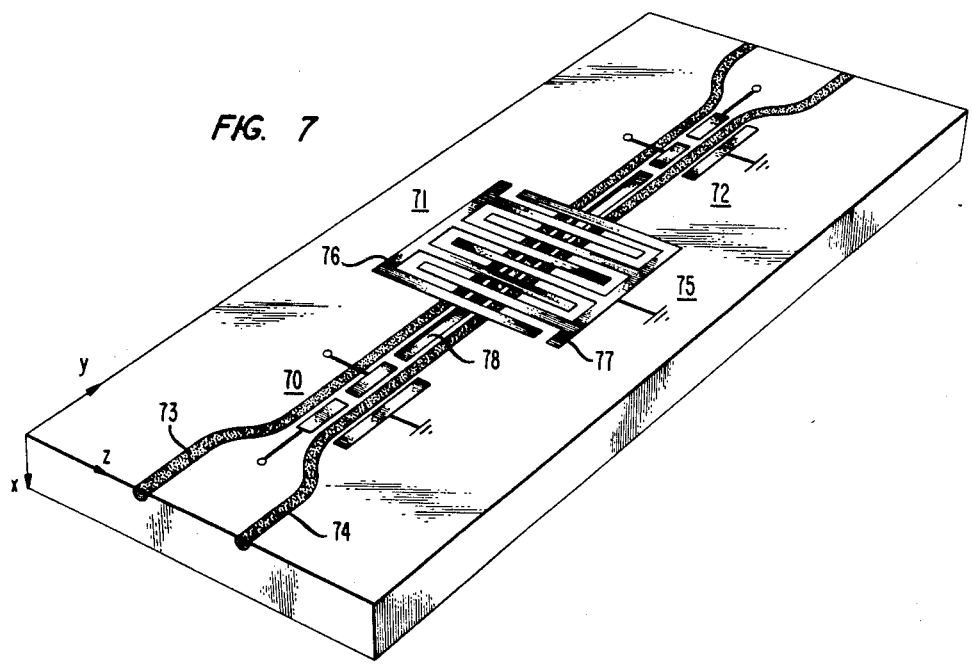

FIGS. 6 and 7 show two fully integrated embodiments of a tunable, polarization independent filter adapted for use at optical wavelengths. Using an x-cut crystal for purposes of illustration, both embodiments employ polarization selective couplers 60, 62 and 70, 72 of the type illustrated in FIG. 3, and mode converters 61, 65 and 71, 75 of the type illustrated in FIG. 4.

As noted hereinabove, while the two mode converters share a common pair of electrodes 66, 67 and 76, 77, the waveguides 63, 64 and 73, 74 are not in a coupling relationship. In the embodiment of FIG. 6 this is accomplished by physically separating the two waveguides 63 and 64 in the region between the polarization selective couplers 60 and 62. In the embodiment of FIG. 7 the waveguides 73 and 74 are not physically separated, but are optically decoupled by means of a groove 78 cut between the waveguides in the region between the polarization couplers.

Figure 8:
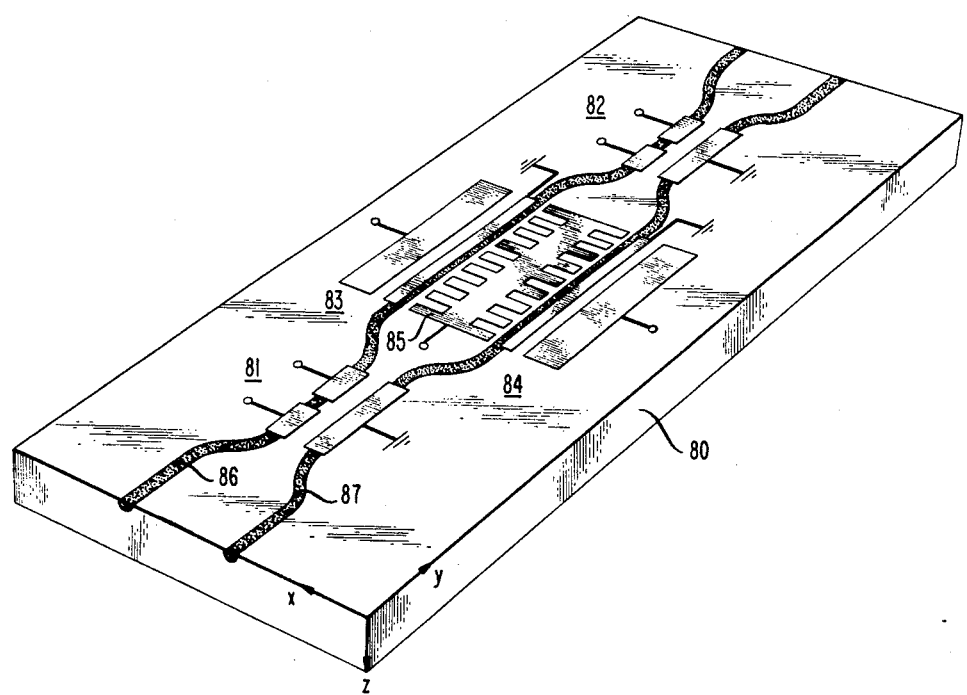

FIG. 8 shows an integrated optical embodiment of the invention using a z-cut substrate 80. In this embodiment, the two polarization selective couplers 81 and 82 are of the type shown in FIG. 2, and the two mode converters 83 and 84 are of the type shown in FIG. 5. In this configuration, the finger electrodes for the two converters are shown fabricated as a single electrode 85 with two sets of oppositely located fingers. As in all these configurations, the waveguides 86 and 87 are not in coupling relationship in the region between couplers 81 and 82.

In the description of the invention given hereinabove, lithium niobate and lithium tantalate were referred to as illustrative materials. Similarly, other materials that have a $C_{3v}$ crystal structure can be used. More generally, any birefringent material that is low loss at the wavelengths of interest and whose electrooptic perturbation tensor has off-diagonal components can be employed to practice the invention.

What is claimed is:

1. A wavelength filter (10) comprising:
    an input polarization selective coupler (11) for separating, in two different wavepaths (12, 13), orthogonally polarized wave components (TE, TM) of an arbitrarily polarized input signal;
    a wavelength selective (TE⇌TM) mode converter (14, 15) located in each of said wavepaths (12, 13);
    and an output polarization selective coupler (16) for combining in one output signal path (17) signal components centered about the wavelength of said mode converters, and for combining in a second output wavepath (18) the balance of said input signal.

2. The filter according to claim 1 wherein each of said couplers (11, 16) comprises:

a pair of optical waveguides (20, 21) (31, 32) formed in a substrate (22, 30) of birefringent material of lower refractive index;

said waveguides being in coupling relationship over a defined distance (L) and having phase constants ($\beta_{TM}$, $\beta_{TE}$) which are equal for wave components of one polarization and unequal for wave components polarized orthogonal to said one polarization.

3. The filter according to claim 1 wherein each mode converter comprises:

an optical waveguide (40, 41) embedded in a substrate (42) of birefringent, electrooptic material of lower refractive index;

and wavelength selective means, longitudinally spaced along said waveguide, for inducing selective coupling between orthogonally polarized (TE, TM) wave components;

characterized in that said wavelength selective means are a pair of interdigital electrodes (43, 44) shared in common by both of said mode converters.

4. The filter according to claim 3 wherein said waveguides (73 and 74) are optically decoupled by means of a groove 78 located in the region of said substrate between said waveguides.

5. A tunable mode converter comprising:

an optical waveguide (50) formed in a z-cut substrate (55) of birefringent, electrooptic material of lower refractive index having a $C_{3v}$ crystallographic structure;

a first uniform electrode (51) extending along, and partially over a portion of said waveguide;

a second uniform electrode (52) disposed along one side of said waveguide adjacent to said first electrode;

a third, finger electrode (53) disposed along the other side of waveguide opposite said second electrode;

a first voltage ($V_1$) impressed between said first and third electrodes for inducing TE$\rightleftarrows$TM mode conversion within said waveguide;

and a second voltage ($V_2$) impressed between said first and second electrodes such that $\Delta\beta=0$ at the wavelength of interest where $$\Delta\beta = \frac{2\pi}{\lambda} |N_{TE} - N_{TM}| - \frac{2\pi}{\Lambda}.$$

$\lambda$ is the wavelength of interest;

$N_{TE}$, $N_{TM}$ are the effective indices for the respective modes; and $\Lambda$ is the finger-to-finger spacing of the finger electrode.

* * * * *